(No Model.)

J. C. AWALT.
COTTON SWEEP.

No. 334,409. Patented Jan. 19, 1886.

WITNESSES

INVENTOR
Jessie C. Awalt
per C. A. Snow & Co.
Attorneys

UNITED STATES PATENT OFFICE.

JESSE C. AWALT, OF STEWARD'S MILLS, TEXAS.

COTTON-SWEEP.

SPECIFICATION forming part of Letters Patent No. 334,409, dated January 19, 1886.

Application filed August 28, 1885. Serial No. 175,582. (No model.)

*To all whom it may concern:*

Be it known that I, JESSE C. AWALT, a citizen of the United States, residing at Steward's Mills, in the county of Freestone and State of Texas, have invented a new and useful Improvement in Cotton-Sweeps, of which the following is a specification, reference being had to the accompanying drawings.

My invention has relation to improvements in cotton-sweeps; and the novelty consists in the peculiar construction, combination, and arrangement of the various parts for service, substantially as hereinafter fully set forth, and particularly pointed out in the claims. Heretofore in this class of devices it has been common to construct a sweep with two solid wings, or with one solid and one cut-away wing. The sweep with the solid wings at both sides is objectionable, for the reason that it cannot be run close enough to the plants to carry off the dirt therefrom without cutting or injuring them; and the second construction, above described, or the sweep with one wing cut away and the other solid, has a blunt end, and is liable to throw too much earth on the young plants and completely cover them.

My invention has for its object to provide a sweep which can be used either as a solid sweep or with one wing solid and the other cut away; to so construct the cut-away wing that it can be run very close to the plants without injuring them or throwing too much dirt or earth thereon to cover them, and to provide a sweep which shall be cheap, strong, durable, and effective.

Figure 1:
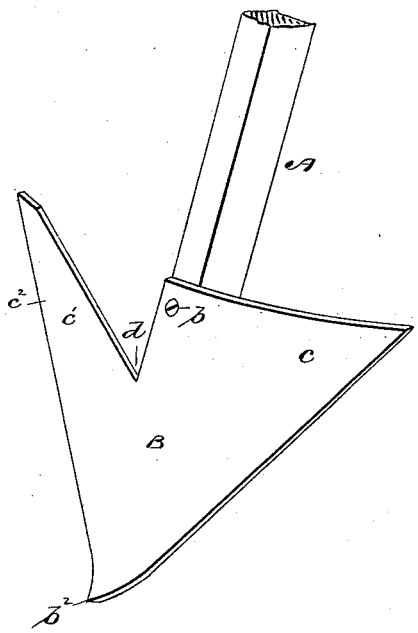
Figure 2:
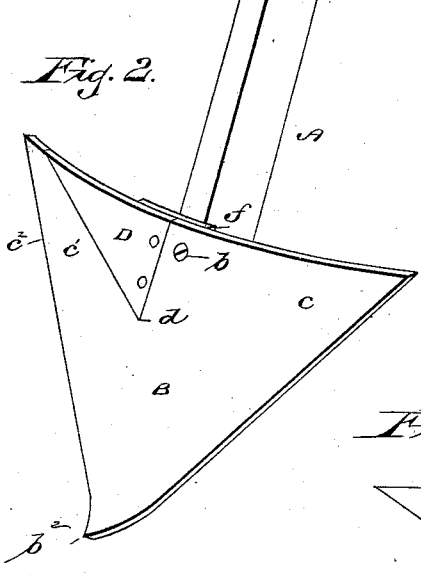
Figure 3:
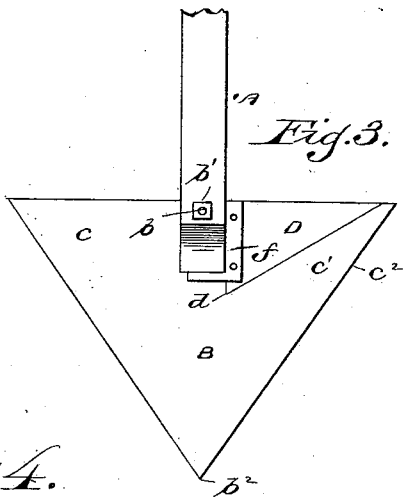
Figure 4:
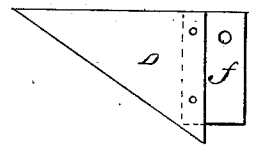

In the drawings, Figure 1 is a perspective view of a cotton-sweep in position upon a standard and adapted for use as a one-armed sweep. Fig. 2 is a view of the device as a solid sweep; and Fig. 3 is a rear view of the sweep. Fig. 4 is a rear view of the detachable plate or section of the sweep.

Like letters of reference denote corresponding parts in the several figures of the drawings, referring to which—

A designates the stock or standard, to the lower end of which is secured the sweep or shovel B, by means of a through-bolt, $b$, and nut $b'$.

My improved sweep or shovel B comprises a triangular plate, made of a suitable metal, having the point $b^2$ bent out. One wing or arm of the sweep $c$ is made solid, while the other wing, $c'$, is cut away, as at $d$, said opening or cut-away portion being made approximately triangular in shape, and formed at the upper edge thereof to one side of the standard or foot B. The cut-away portion is so arranged that the arm $c^2$ of the sweep-wing $c'$ is very narrow at its outer upper end, or nearly pointed, thus providing for the wing $c'$ to run very close to the plants and carry off the surplus dirt therefrom, together with leaves, sticks, and other matter.

In moving the machine forward the wing $c'$ of the sweep will clear away the dirt, which, when a sufficient quantity has been accumulated in front of the sweep, will pass through the cut-away portion of the wing in lieu of out at the sides thereof, as in the case of the solid and one-winged sweep as heretofore constructed, the dirt, &c., escaping from the sides of the sweep completely covering the young plants in many instances and destroying them.

The improved sweep is very efficient in operation, as I have found by practical experience, the cut-away portion of the wing serving to provide a narrow arm thereto which can run very close to the plants without injuring and throwing too much dirt thereon, the surplusage thereof passing through the cut-away portion or adapted to be forced upon weeds, &c., growing between the furrow, by the solid wing of the sweep.

To convert the device into a sweep having double wings, I provide the plate or section D, made triangular in shape and of a size to snugly fit in the cut-away portion of the sweep-wing $c'$. This plate is provided at one edge with a tongue or flange, $f$, cast therewith or secured thereto in any preferable manner, said tongue fitting between the sweep proper and the standard, and secured in position in the cut-away portion by means of the bolt and nut $b\ b'$.

It will be observed from the foregoing that I provide a cotton-sweep which is thoroughly effective in operation, which can be used as a sweep with a cut-away wing or converted into a sweep with two solid wings, practically, and that the means for securing the removable wing-section in position can be manipulated easily and readily.

The sweep or plate is slightly curved transversely from the middle thereof toward each side edge to more effectually discharge or throw the dirt, &c., to either side thereof.

I attach importance to making the blade B triangular in form, being slightly curved in a horizontal transverse plane, and having the triangular cut-out opening or dirt-passage and the removal wing, as therein lie the gist of this invention.

By means of the triangular blade with the bent point the device can be run very closely to the young plants without danger of injuring them, and the blade can be made very cheaply and quickly. The triangular form of blade can be made very large, which is especially desirous in cultivating, and the discharge-opening therein can be made comparatively large without weakening the blade to permit of the quick discharge of dirt gathered by the solid pointed end of the sweep. This large cut-out discharge-opening permits the quick discharge of the dirt to obviate the liability of throwing too much dirt on the young plants and exerting too much pressure on them when the device traverses the furrow.

The blade or sweep is secured to the stock at its middle, so that the wings thereof shall project on opposite sides of the stock, thus permitting the wing having the discharge-opening to run closely to the plants on one side and the dirt to pass through the opening therein, while the solid wing of the sweep discharges the surplus dirt on the plants on the opposite side of the furrow, the transverse curve in the blade facilitating such discharge.

The sweep and its removable wing are attached to the plow-stock by a single bolt and nut, and they can be readily removed from the stock of one implement and applied to that of another implement, the interchange being quickly and readily affected.

I am aware that it is not broadly new to provide a cotton-sweep having a cut-out portion to which a removable wing-section is bolted. My invention differs from this in the fact that my wing-section has a flange, $f$, rigidly secured thereto, and adapted to fit between the sweep and the stock and be secured to the sweep, and both having aligned openings and secured to a standard by a single through-bolt and nut.

Having thus fully described my invention, what I claim as new, and desire to secure by Letters Patent, is—

1. The combination, with the sweep having a discharge-opening at one side of its upper edge, of a detachable wing-section adapted to fit in the sweep-opening and having a rigid flange to bear against the rear face of the sweep, the said sweep and flange having aligned openings and a single through-bolt and nut to secure the wing-section to the sweep, and secure both the sweep and wing-section to a standard, substantially as described.

2. The combination of a stock, A, a triangular transversely-curved sweep, B, having a bent point, $b^2$, and secured to the stock at or near its middle so that the wings $c\ c'$ thereof are located on opposite sides of the stock, one wing, $c$, of said sweep being left solid, and the other wing, $c'$, having a cut-out portion, $d$, to provide a dirt-discharge opening and a tapering arm, $c^2$, a removable wing-section, D, adapted to be fitted in the discharge-opening $d$ of the sweep to convert the device into a solid sweep, and having a flange or ledge, $f$, interposed between the stock and sweep, and a single through-bolt and nut, $b\ b'$, to detachably secure the sweep B and wing-section D to the stock A, substantially as described, and for the purpose set forth.

In testimony that I claim the foregoing as my own, I have hereto affixed my signature in presence of two witnesses.

JESSE C. AWALT.

Witnesses:
C. E. YOUNG,
T. J. SIMS.